(Model.)

G. W. WARNER.
HINGE.

No. 374,098. Patented Nov. 29, 1887.

Witnesses:
Albert H. Adams.
Harry T. Jones.

Inventor:
George W. Warner
By West & Bond
His Attys.

N. PETERS, Photo-Lithographer, Washington, D. C.

UNITED STATES PATENT OFFICE.

GEORGE W. WARNER, OF FREEPORT, ILLINOIS.

HINGE.

SPECIFICATION forming part of Letters Patent No. 374,098, dated November 29, 1887.

Application filed January 13, 1887. Serial No. 224,248. (Model.)

*To all whom it may concern:*

Be it known that I, GEORGE W. WARNER, residing at Freeport, in the county of Stephenson and State of Illinois, and a citizen of the United States, have invented a new and useful Improvement in Hinges, of which the following is a full description, reference being had to the accompanying drawings, in which—

Figure 3:
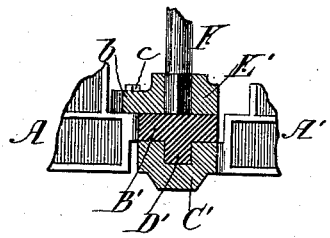
Figure 1:
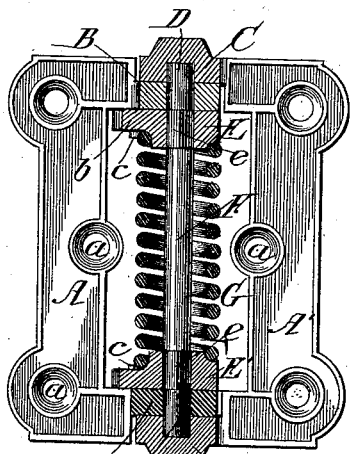
Figure 2:
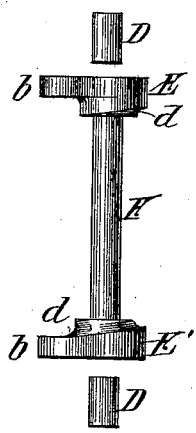
Figure 5:
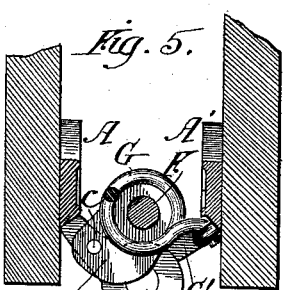
Figure 4:
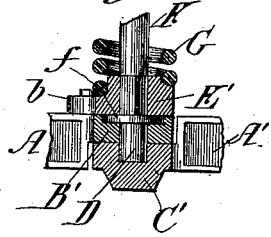
Figure 6:
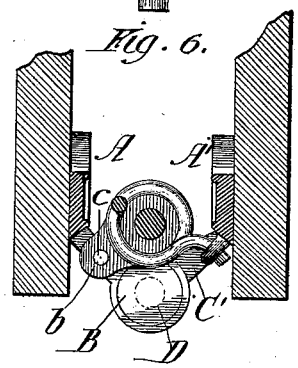
Figure 7:
Figure 8:

Figure 1 is an elevation, with the ears, spring, and spring-holders in section; Fig. 2, an elevation showing the pivot and spring-holder; Fig. 3, a detail, partly in section, showing one of the pivots formed with the ear; Fig. 4, a detail, partly in section, showing a modification in the form of the loose pivot; Figs. 5 and 6, cross-sections showing the position of the parts in use; Figs. 7 and 8, details showing a modification in the form of the loose pivot and the hinge.

This invention relates to certain improvements principally designed for use with spring-hinges of that class in which an independent arbor is used, but adapted for use with other classes of hinges, and has for its objects to construct a fast-joint hinge that can readily and quickly be put together, and using in the construction as few pieces as possible, and have the hinge, when connected, a fast joint, which will not become detached in use, but which can be readily disconnected when required for any purpose; and its nature consists in the several parts and combinations of parts hereinafter described, and pointed out in the claim as new.

In the drawings, A A' represent the two leaves of a complete hinge, each leaf having screw-holes $a$ for attaching purposes; B B', the ears for the leaf A; C C', the ears for the leaf A'; D, the loose pin or pivot; E E', the spring holders or supports; F, the center pin; G, the spring.

The ears B B' of the leaf A, as shown in Fig. 1, when the two leaves are together, lie within the ears C C' of the leaf A', and, as shown in Fig. 1, the ears C C' form sockets through which the hole for the pin or pivot does not pass, and the ears B B' each have a hole for the passage of the pin or pivot D, and, as shown in Fig. 1, both pins or pivots D are loose and pass through the respective ears B B' and enter the closed socket in the respective ears C C', and when in place they are locked against slipping out by the holders E E', each of which has a side projection, $b$, pivotally attached by a pin, $c$, projecting from the respective ears B B', as shown in Figs. 1 and 2. The supports or holders E E' are held in place by the coiled spring G running from holder to holder, and, as shown in Figs. 1 and 2, the holders each have a groove, $d$, to receive and guide the ends of the spring, and in the construction shown in Fig. 1 the center pin, F, has at each end a square tenon, $e$, to enter a square hole in the holders E E'. The hinge shown in Fig. 1 has its parts assembled by bringing the ears B B' and C C' in line to pass the loose pin or pivot D for the respective ears through the ears B B' into the closed sockets of the ears C C', and when in place the holders E E', attached to the center pin, F, with the spring G between them, are slipped into position for the pins $c$ to pass through the projections $b$, and when the parts are together it will be seen that the force of the spring retains the holders E E' firmly in position, and these holders keep the loose pins or pivots D from dropping out, and at the same time the parts can be readily detached by removing the holders E E', which permits the loose pins D to be withdrawn.

As shown in Fig. 1, both pins D are loose; but one of these pins could be loose and the other pin or pivot could be formed with the ear B', as shown in Fig. 3, in which D' represents the pin or pivot, and in this form of construction the parts are assembled by inserting D' into the socket therefor in the ear C' and bringing the ears B C in line for the loose pin D to be passed through the hole therefor in the ear B and into the socket in the ear C, and then inserting the spring-holders E E', pin F, and spring G in place.

As shown in Fig. 4, the loose pin D has a rim or head, $f$, formed on one end, which enters a recess formed in the ear, and this head $f$ gives a larger surface contact for the movement of the parts in opening and closing the hinge in use.

The pin D, instead of having a continuous head or flange, $f$, as shown in Fig. 4, can have a lip or projection, $g$, as shown in Fig. 8, and, if desired, the ear through which the pin D passes can be provided with a recess, $h$, to receive the lip or projection $g$, as shown in Fig.

7, and form a lock against the turning of the pin, and this lip g is to be located in such relation to the head as that the turning of the head in opening and closing the hinge will not remove the contact between the head and pin by which the pin is held in place.

The use of a loose hinge-pin enables a fast joint to be formed when the pin is in place, so that the hinge, as a whole, will work properly in opening and closing, and at the same time the loose hinge-pin enables the separation of the hinge to be readily had whenever required, and in use the loose hinge-pin will be held in place by the bearing force exerted by the spring, and by using a ratchet device any required tension can be given to the spring.

What I claim as new, and desire to secure by Letters Patent, is—

A fast-joint hinge having one of the hinge-pins loose, in combination with a closed socket and a retaining device, consisting of an independent arbor or center pin, a spring, and spring-holders, substantially as specified.

GEORGE W. WARNER.

Witnesses:
JAMES H. STEARNS,
R. F. HAYES.